US008457591B2

(12) United States Patent
Lambert et al.

(10) Patent No.: US 8,457,591 B2
(45) Date of Patent: Jun. 4, 2013

(54) METHOD AND APPARATUS FOR RESERVING RESOURCES FOR EMERGENCY SERVICES IN A WIRELESS COMMUNICATION SYSTEM

(75) Inventors: Steven J. Lambert, Mount Prospect, IL (US); Thomas P. Emmons, Jr., Mesa, AZ (US)

(73) Assignee: Motorola Solutions, Inc., Schaumburg, IL (US)

( * ) Notice: Subject to any disclaimer, the term of this patent is extended or adjusted under 35 U.S.C. 154(b) by 333 days.

(21) Appl. No.: 12/839,498

(22) Filed: Jul. 20, 2010

(65) Prior Publication Data
US 2011/0053553 A1 Mar. 3, 2011

Related U.S. Application Data (60) Provisional application No. 61/238,415, filed on Aug. 31, 2009.

(51) Int. Cl.
*H04M 11/04* (2006.01)
*H04W 72/00* (2009.01)

(52) U.S. Cl.
USPC ............... 455/404.2; 455/404.1; 455/450

(58) Field of Classification Search
USPC .................... 455/404.1, 404.2, 450
See application file for complete search history.

(56) References Cited

U.S. PATENT DOCUMENTS

| 5,862,485 A | 1/1999 | Linneweh, Jr. |
| 6,522,885 B1* | 2/2003 | Tang et al. ............ 455/447 |
| 8,068,841 B2* | 11/2011 | Laroia et al. ............ 455/447 |
| 2009/0143046 A1* | 6/2009 | Smith ............ 455/404.1 |

FOREIGN PATENT DOCUMENTS

EP 1 045 604 A2 10/2000

OTHER PUBLICATIONS

Hector Jasso, et al. "Prediction of 9-1-1 Call Volumes for Emergency Event," The Proceedings of the 8th Annual International Digital Government Research Conference, Philadelphia, PA, USA, May 20-23, 2007, pp. 148-154.
Robert H. Warren, "Early Detection of Crises Using Radio Traffic Analysis," Grant Proposal, Mar. 22, 2003, 3 pages.
John M. Harris, et al. "Location Based 911 Call Center Outgoing Message Control"; May 16, 2000; 2 Pages.
PCT International Search Report Dated Nov. 16, 2010.

* cited by examiner

*Primary Examiner* — Melody Mehrpour
*Assistant Examiner* — Natasha Cosme
(74) *Attorney, Agent, or Firm* — Steven A. May; Daniel R. Bestor (57) ABSTRACT

A method and apparatus for determining a scope of priority service in a communication system in an emergency event is described. The method includes: at a network device in the communication system: receiving at least one emergency call; determining at least one parameter associated with the at least one emergency call; determining a scope of a priority service in the communication system based on the determined at least one parameter; and reserving resources in the communication system based on the determined scope of priority service.

21 Claims, 5 Drawing Sheets

METHOD AND APPARATUS FOR RESERVING RESOURCES FOR EMERGENCY SERVICES IN A WIRELESS COMMUNICATION SYSTEM

CROSS-REFERENCE TO RELATED APPLICATION

This application claims priority from provisional application Ser. No. 61/238,415, entitled "METHOD AND APPARATUS FOR RESERVING RESOURCES FOR EMERGENCY SERVICES IN A WIRELESS COMMUNICATION SYSTEM,", filed Aug. 31, 2009, which is commonly owned and incorporated herein by reference in its entirety.

FIELD OF THE DISCLOSURE

The present disclosure relates generally to wireless communication systems and more particularly to a method and apparatus for reserving resources for emergency services in a wireless communication system in an emergency event.

BACKGROUND

During emergency events, a volume of calls in a communication system increases tremendously, often congesting the communication system. The congestion of the system results in a low success rate of call completion for all types of users, including emergency personnel and in particular first responders. During these emergency events, there is a desire to give priority service to the first responders over normal commercial users. This priority will then lead to a higher probability of call completion for the first responders. One solution is to reserve the requisite quantity of bandwidth for the first responders at all times. This solution guarantees a higher call completion rate for first responders but results in wastage of bandwidth of the service provider. This reserved bandwidth is not available to commercial users, even during non emergency events such as sporting events. Another method would be to have the operator to manually detect the emergency events and subsequently, manually, reserve a requisite quantity of bandwidth for the first responders' communication devices. However, manual detection and reservation also have a substantially long inherent delay associated with reserving the bandwidth.

Accordingly, there is a need for a method and apparatus for reserving bandwidth for emergency services in an emergency event that provides acceptable probability of call completion for the first responders while minimizing bandwidth wastage and reservation delay.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, a method for reserving bandwidth for emergency services in an emergency event is described. The method includes: receiving at least one emergency call; determining at least one parameter associated with the at least one emergency call; determining a geographical range in which to reserve resources for provision of emergency services in the communication system based on the determined at least one parameter; and reserving resources for use by emergency personnel in the determined geographical range.

Figure 1:
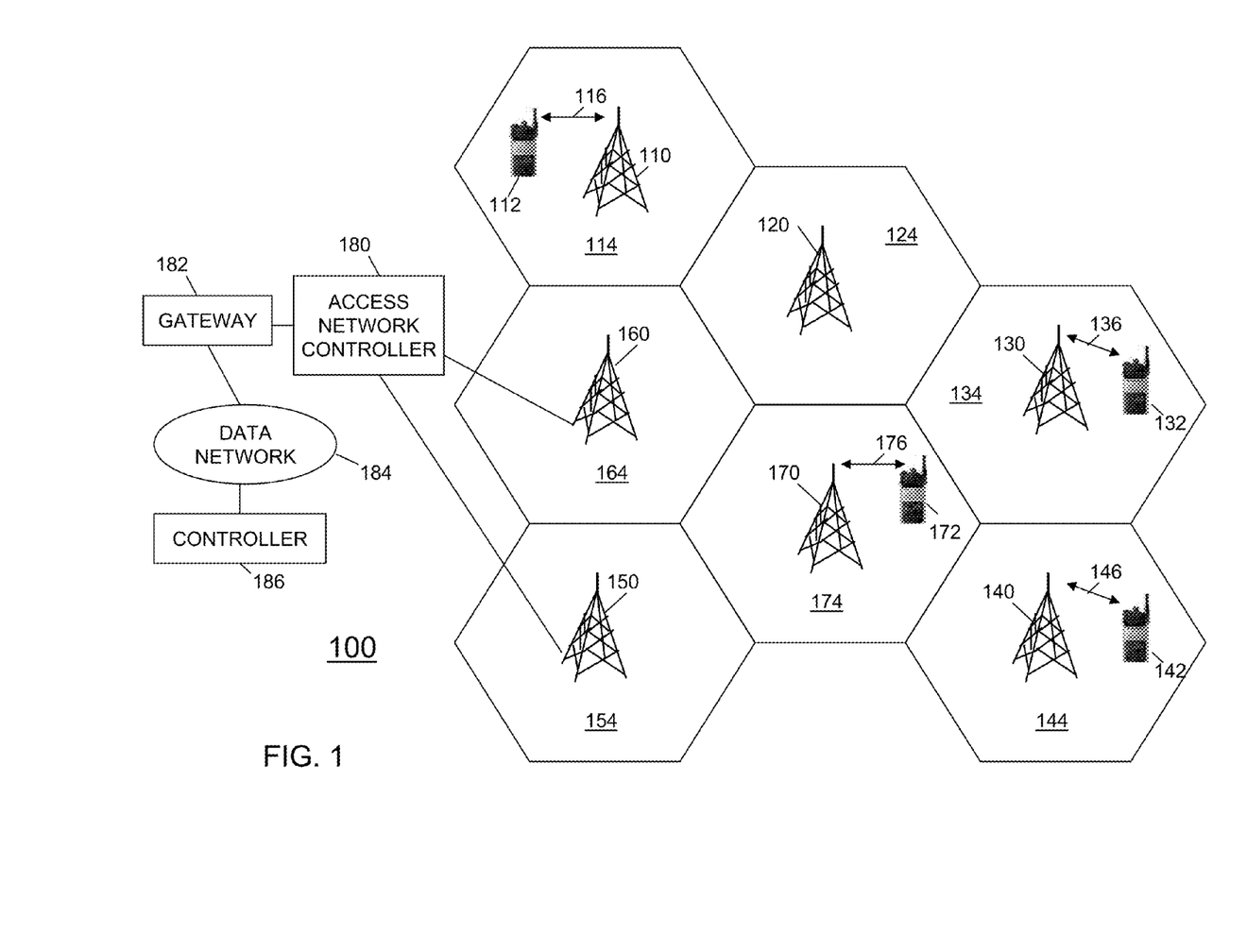
FIG. 1 is a system diagram of a wireless communication system in accordance with some embodiments.

Referring now to the figures, FIG. 1 is a system diagram illustrating a wireless communication system 100 in accordance with some embodiments of the present invention. Communication system 100 may be any type of communication system that implements prioritized emergency communication services. For example, communication system 100 may operate according to, but not limited to, any one or more of the OMA (Open Mobile Alliance), 3GPP (3rd Generation Partnership Project), 3GPP2 (3rd Generation Partnership Project 2), IEEE (Institute of Electrical and Electronics Engineers) 802.xx, and WiMAX Forum standards.

As used herein, a "communication system" is a system that includes one or more network-based communication devices that communicate with wireless user communication devices in the system and that manages communication between the communication devices.

Communication system 100 is depicted in a very generalized manner. For example, communication system 100 includes multiple base stations (BSs) 110, 120, 130, 140, 150, 160, 170 (seven shown), such as but not limited to a Node B, an Access Point, or a Base Transceiver Station (BTS). Each base station (BS) 110, 120, 130, 140, 150, 160, 170 provides wireless service to mobile stations (MSs) residing in a corresponding coverage area 114, 124, 134, 144, 154, 164, 174 of the BS. Each BS 110, 120, 130, 140, 150, 160, 170 is coupled to an access network controller 180, such as a base station controller (BSC) or a radio network controller (RNC), which access network controller is, in turn, coupled to a gateway 182, such as a mobile switching center (MSC), a media gateway, or the like. For ease of illustration, FIG. 1 illustrates communication links between the controller 180 and the BSs 150, 160. In a real time operation, the access network controller 180 is in communication with all of the multiple BSs 110, 120, 130, 140, 150, 160, 170. However, in various embodiments of the present invention, one of more of BSs 110, 120, 130, 140, 150, 160, 170 may be coupled to a different access network controller than other BSs of the multiple BSs 110, 120, 130, 140, 150, 160, 170, and, in turn, one or more of such multiple access network controllers may share a same gateway or be coupled to a different gateway than other access network controllers of such multiple access network controllers.

Communication system 100 further includes a network-based priority service controller 186 that is in communication with the gateway 182, and via the gateway with each of BSs 110, 120, 130, 140, 150, 160, and 170, via a data network 184. However, in other embodiments of the present invention, the functionality of the priority service controller 186 may reside in a gateway, such as gateway 182, or access network controller, such as access network controller 180, of communication system 100 or some or all of the functionality described herein as being performed by priority service controller 186 may be distributed among one or more gateways and/or access network controllers of the communication system. As used herein, each of the BSs 110, 120, 130, 140, 150, 160, 170, the access network controller 180, the gateway 182, the data network 184, and the priority services controller 186 is a part of a fixed network infrastructure and may also be referred to herein as a network element.

Communication system 100 also includes multiple MSs 112, 132, 142, 172 (four shown), such as, but not limited to, devices commonly referred to as access terminals, mobile radios, mobile stations, subscriber units, user equipment, mobile devices, or any other user device capable of operating in a wired or wireless environment. Examples of a mobile station (MS) such as MSs 112, 132, 142, and 172 include, but are not limited to, two-way radios, mobile phones, cellular phones, Personal Digital Assistants (PDAs), laptops and pagers.

Each of MSs 112, 132, 142, and 172 receive network services from a serving BS via a corresponding air interface. Each BS 110, 120, 130, 140, 150, 160, 170 can receive information (either control or media, e.g., data, voice (audio), video, etc.) in a signal from an MS residing in a coverage area of the BS, and transmit information in signals to one or more such MSs, via the air interface. In general, each air interface includes a downlink (DL) that includes a pilot channel, at least one DL traffic channel, and DL common and dedicated signaling channels. Each air interface further includes an Uplink (UL) that includes at least one UL traffic channel, UL common and dedicated signaling channels, and an access channel. For example, as illustrated in FIG. 1, BS 110 communicates with MS 112 via air interface 116, BS 130 communicates with MS 132 via air interface 136, BS 140 communicates with MS142 via air interface 146, and BS 170 communicates with MS 172 via air interface 176.

The air interfaces operate in accordance with the particular access technology supported by the corresponding BS. For example, the air interfaces may all utilize a same technology or they may utilize different access technologies. Moreover, each MS includes the capability to communicate with a BS through one or more wireless communication protocols such as Advanced Mobile Phone System (AMPS), Code division multiple access (CDMA), Time division multiple access (TDMA), Global System for Mobile communications (GSM), Integrated Digital Enhanced Network (iDEN), General Packet Radio Service (GPRS), Enhanced Data rates for GSM Evolution (EDGE), Universal Mobile Telecommunications System (UMTS), Wideband Code Division Multiple Access (WCDMA), Code division multiple access 6000 (CDMA6000), and their variants.

The priority services controller 186 may reside anywhere in the network of communication system 100, so long as the controller is able to communicate with BSs 110, 120, 130, 140, 150, 160, and 170 and may comprise a server that communicates with each of the BSs via a data network (not shown) of comm comprise any one or more of a Base Station Controller (BSC), a Base Station-control Function (BSF), a Mobile Switching Center (MSC), an application server, a Push-to-Talk (PTT) server, or any other type of network device that may provide control functionality with respect to BSs 110, 120, 130, 140, 150, 160, and 170.

Figure 2:
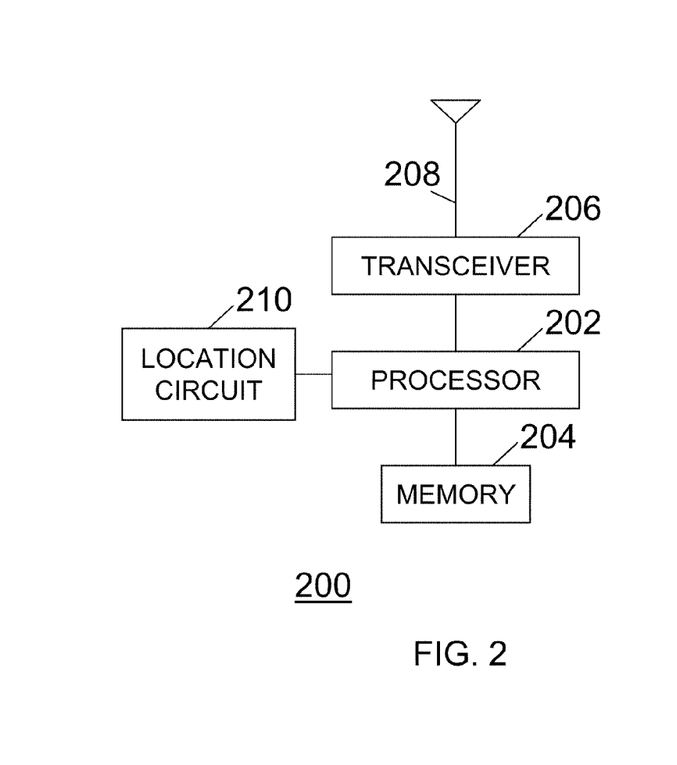
FIG. 2 is a block diagram showing exemplary components of a mobile station of FIG. 1 in accordance with some embodiment.
Figure 3:
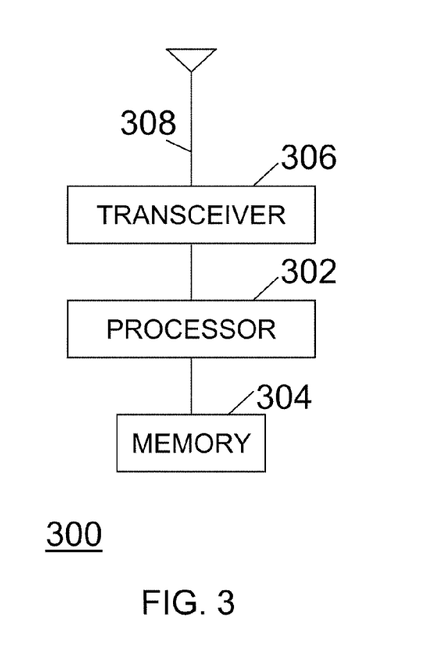
FIG. 3 is a block diagram showing exemplary components of a base station of FIG. 1 in accordance with some embodiment.
Figure 4:
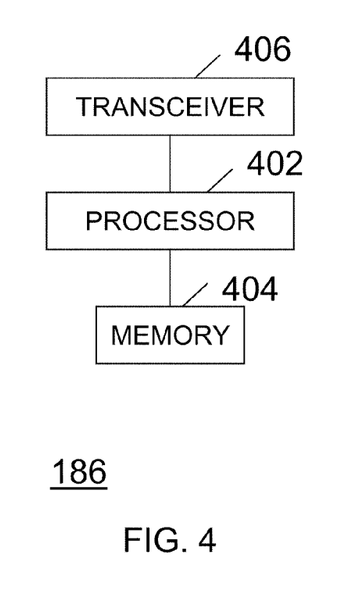
FIG. 4 is a block diagram showing exemplary components of a Controller of FIG. 1 in accordance with some embodiment

Referring now to FIGS. 2, 3, and 4, an architecture of an MS 200, such as MSs 112, 132, 142, 172, a BS 300, such as BSs 110, 120, 130, 140, 150, 160, and 170, and the controller 186, are provided in accordance with an embodiment of the present invention. Each of MS 200, BS 300, and controller 186 includes a respective processor 202, 302, 402, such as one or more microprocessors, microcontrollers, digital signal processors (DSPs), combinations thereof or such other devices known to those having ordinary skill in the art, which processor is configured to execute the functions described herein as being executed by MS, BS, and controller. Each of MS 200, BS 300, and controller 186 further includes a respective at least one memory device 204, 304, 404, such as random access memory (RAM), dynamic random access memory (DRAM), and/or read only memory (ROM) or equivalents thereof, that is coupled to the processor and that maintains data and programs that may be executed by the associated processor and that allows the MS, BS, and controller to perform all functions necessary to operate in communication system 100. Each of at least one memory devices 304, 404 further maintains the threshold values described below, such as a local, regional, and global threshold values and a localized mode BS threshold value. Unless otherwise described herein, the functionality described herein as being performed by each of MSs 112, 132, 142, 172, BSs 110, 120, 130, 140, 150, 160, and 170, and controller 186 is performed by the respective processor 202, 302, 402, of the MS, BS, and controller based on data and programs maintained in the respective at least one memory device of the MS, BS, and controller.

MS 200 further includes a transceiver 206 coupled to the processor 202 and an antenna 208 for wirelessly communicating with a BS, and BS 300 further includes a transceiver 306 coupled to the processor 302 and an antenna 308 for wirelessly communicating with an MS. Further, each of transceivers 206 and 306 includes a radio frequency (RF) transmitter (not shown) and an RF receiver (not shown) as known in the art. MS 200 additionally includes a location circuit 210 coupled to the processor 202 that determines a current location of the MS. For example, location circuit 210 may include, but is not limited to, a Global Positioning System (GPS) receiver, a triangulation receiver, an accelerometer, a gyroscope, or any other information-collecting device that can identify a current location of the MS. Additionally, the controller 186 includes a transceiver 406 for exchanging information with other network elements of communication system 100, for example, for obtaining call information from a BS 110, 120, 130, 140, 150, 160, 170, access network controller 180, or gateway 182, or for obtaining location information from a BS 110, 120, 130, 140, 150, 160, 170, access network controller 180, gateway 182, or a location database (not shown), such as a Home Location Register (HLR), Visitor Location Register (VLR), or Home subscriber Server (HSS), via data network 184.

Only a limited number of controllers, network devices, and MSs are shown for ease of illustration. However, communication system 100 can comprise any number of controllers that supports any number of BSs and MSs based on system requirements. Moreover, embodiments are not dependent on the applications and protocol(s) running on the devices in the system and used to facilitate communications in the system but can be used with any such applications and protocols.

The teaching of the disclosure herein can be used to detect an emergency event and then provision/reserve resources within the communication system for use by emergency services and emergency service providers, for example, communication channels in the air interfaces or more particularly access channels or any other communication resources that may unacceptably interfere with access to the system by the emergency service providers. Further, the disclosure also teaches a method to un-provision/release reserved resources in response to a detection of an end of the emergency event.

In case of an emergency event, often the first responders are emergency agency personnel that are among the first people to report at the site. The primary tasks of the first responders are to ensure control over the emergency event and to inform other emergency agencies about the emergency event.

In an illustrative embodiment, prior to an occurring of the emergency event, the communication system 100 operates in a normal mode of operation. The term "normal mode of operation" refers to a mode of operation wherein resources of the communication system are not provisioned/reserved for exclusive use by the first responders' devices.

When a prioritized user, also referred to herein as a first responder, initiates a call on a first responder's device, such as on one of MSs 112, 132, 142, and 172, a network device, preferably the controller 186, recognizes the call as coming from the first responder. For example, when a first responder initiates an emergency call, the call setup messaging includes an indicator that the call is an emergency call, such as one or more of a National Security (NS) and an Emergency Preparedness (EP) indicator. In response to receiving the call and based on the emergency call indicator, the processor of a network device, such as the processor 302, 402 of one or more of BSs 110, 120, 130, 140, 150, 160, 170, and controller 186, determines that the call is an emergency call and initiates a reservation of resources for use by emergency personnel according to the teachings of the disclosure herein. As used herein, emergency personnel, emergency users, and first responders are used interchangeably and refer to providers of emergency services, such as but not limited to policemen, firemen, and health care workers responding to an emergency event.

In one embodiment, the reservation of resources at least comprises allocating bandwidth for the exclusive use by the emergency personnel so as to ensure a higher probability of successful call completion for the emergency personnel.

In one embodiment, the controller 186 begins reserving the resources for use by the emergency personnel when a predetermined number of calls have been initiated from emergency personnel.

Further, when an end of the emergency event is detected, then the resources reserved for exclusive use by the emergency personnel in the communication system are released, according to the teachings of the disclosure herein.

Figure 5:
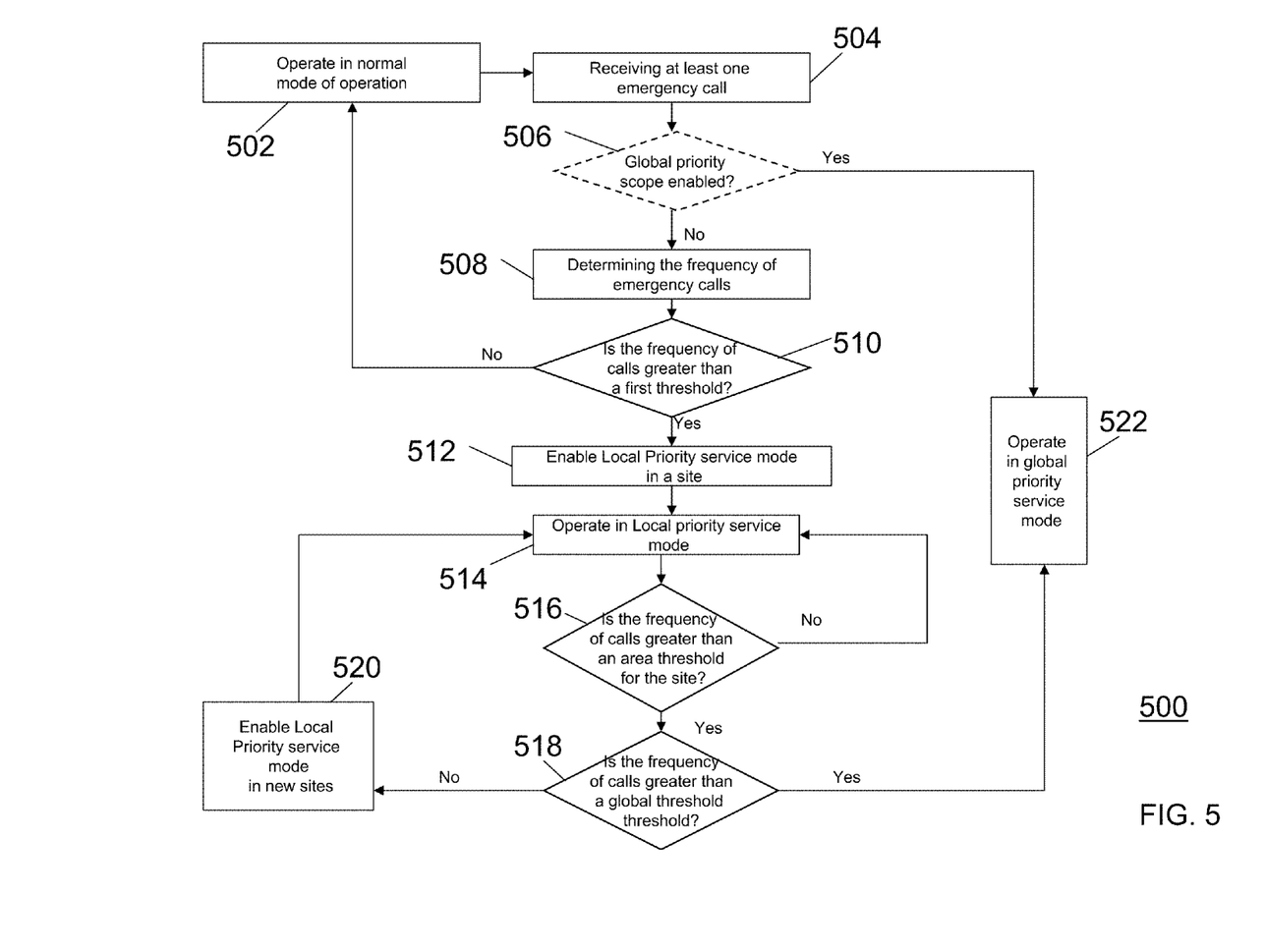
FIG. 5 is a flowchart of a method for determining the scope of priority services in a communication system in an emergency event in accordance with some embodiments.

Turning now to FIG. 5, depicted therein is a logic flow diagram 500 illustrating a method for determining, by communication system 100 and in particular by the controller 186, a geographical area associated with a reservation of resources for priority services, and in particular for use by emergency personnel, in an emergency event in accordance with various embodiments of the present invention. The term "priority services in an emergency event" can be defined as a state of services, wherein the first responders are assured a high probability, for example, at least a 90% probability, of completing a call irrespective of the congestion and/or other parameters in the communication system 100. More particularly, controller 186 determines, and reserves for exclusive use by emergency users in a given geographical area, a sufficient quantity of resources, such as communication channels in the air interfaces or more particularly access channels or any other communication resources that may unacceptably interfere with access to the system by the emergency service providers, such that a noise rise on an UL is limited to a predetermined level that will assure that an MS of an emergency user has sufficient power to transmit at an acceptable signal quality level. In other words, communication system 100 removes, from availability to non-emergency users (e.g., the general public) and reserves for exclusive use by emergency users and/or prevents from activating altogether, in the given geographical area, a sufficient quantity of resources to assure that emergency users are able to engage in communications without incurring an unacceptable level of interference from non-emergency users and/or to assure an acceptable level of self-interference, that is, reverse noise rise (that is, to limit, to an acceptable level, the amount of self-interference generated).

While the method depicted in FIG. 5 preferably is performed at the controller 186, the method can also be implemented in any of the network elements of communication system 100. Further, it should also be realized that method 500 includes functionality that may be performed in hardware, firmware, software, or a combination thereof and may further be performed at a single hardware device or a combination of hardware devices at multiple network elements. Also, one or more steps of the method 500 can be facilitated by supporting external hardware units.

Logic flow diagram 500 begins when communication system 100 is operating (502) in a normal, that is, non-emergency, mode or scope of operation. Communication system 100, and in particular the controller 186, receives information concerning an initiation of an emergency call by a prioritized user, that is, a first responder, for example, from MS 112, via a BS serving the MS, that is, BS 110. The controller 186 may receive the call and/or may receive information concerning the call, which information identifies the calls as emergency call. For example, the call or call information received by the controller 186 may include an emergency call indicator associated with the call, for example, a National Security (NS) and/or an Emergency Preparedness (EP) indication associated with the call. For example, the controller 186, on receiving the call, may perform a dialed digit analysis to identify the NS and/or EP indications associated with the call. In response identifying the call as an emergency call, the controller 186 determines a geographical area, from among multiple geographical areas, in which to reserve resources for use by the prioritized users, also referred to herein as emergency personnel or first responders. The multiple geographical areas comprise geographical areas of expanding geographical scope, wherein each larger geographical area includes all smaller geographical areas plus additional geographical area. For example, a first geographical area may comprise a localized area, such as a coverage area of a first BS. A second geographical area may then include the first geographical area and more, for example, the coverage area of the first BS and, additionally, neighbor BSs to the first BS. A third geographical area may then include the second geographical area and more, for example, may cover the entire communication system ("global" coverage). Or the third geographical area may include the coverage area of the first BS and neighbor BSs to the first BS and, additionally, all BSs served by the MSC that serves the first BS, and a fourth geographical area may include the entire communication system. The number of such expanding geographical areas, and the geographical scope of each such area, is up to a designer of communication system 100. While three such areas are described below (local, regional, and global), these areas are used to illustrate the principles of the present invention and are not intended to limit the invention in any way.

In determining a geographical area, from among multiple geographical areas, in which to reserve resources for use by the prioritized users, the controller 186, in response identifying the call as an emergency call, determines (506) whether the communication system 100 is already operating in a 'global priority service mode,' that is, whether the communication system 100 has reserved communication resources throughout the entire communication system, that is, over a system-wide geographical range ("globally"), for exclusive use by the first responders. If the controller 186 determines (506) that the communication system 100 is already operating in a global priority service mode, then the system continues (520) to operate in global priority service mode.

On the other hand, if the controller 186 determines (506) that the communication system 100 is not operating in a global priority service mode, then the controller 186 determines (508) a quantity of emergency calls, that is, a number of calls received from emergency personnel, preferably over a given, or predetermined, period of time. The controller 186 then compares (510) the determined frequency of emergency calls to a localized threshold value. The localized threshold value is a threshold value associated with the BS, such as BS 110, and the corresponding coverage area, such as coverage area 114, serving the first responder, that is, MS 112.

If the quantity of emergency calls is greater than the localized threshold value, then the controller 186 enables (512) a localized priority service at the BS 110 and reserves resources at the BS for exclusive use by the first responders serviced by the BS. That is, the controller 186 reserves resources for use by emergency personnel over a geographical range that is 'local' to the BS 110, that is, coverage area 114. Thus, the BS 110 operates (514) in a 'local priority service mode.' In one embodiment, the reservation of resources at least comprises allocating bandwidth for the exclusive use of the emergency personnel, that is, first responder, devices, so as to ensure the higher call completion rate for the first responders.

If, at step 502, the communication system 100 is operating in a normal, that is, non-emergency, mode or scope of operation and the controller 186 determines, at step 510, that the quantity of calls at the BS does not exceed the localized threshold value, then the controller 186 does not switch the operating mode and the cell site continues to operate (502) in the normal mode of operation.

In the event that the controller 186 determines, at step 510, that the quantity of emergency calls has exceeded the localized threshold value, the controller 186 further determines (516) whether the quantity of emergency calls has exceeded a regional threshold value, which regional threshold value is greater than the localized threshold value. The regional threshold value is associated with a regional priority service mode, wherein resources are reserved for emergency personnel over a geographical range that includes, and extends beyond, the geographical range associated with the local priority service mode. For example, the regional priority service mode may cover a geographical range that includes BS 110 and one or more neighboring BSs. Such determinations may be made by the controller on a periodic basis after determining that the quantity of emergency calls has exceeded the localized threshold value. If the quantity of emergency calls is less than the regional threshold value, then the BS continues to operate (514) in local priority service mode.

If the quantity of emergency calls has exceeded the regional threshold value, then the controller 186 also determines (518) whether the quantity of calls has also exceeded a global threshold value, which global threshold value is greater than the regional threshold value. If the quantity of calls is greater than the global threshold value, then the controller 186 enables (522) the global priority service mode in the communication system 100.

In one embodiment of the present invention, the quantity of emergency calls determined by the controller 186 may be for calls originating in a coverage area associated with the BS serving the first responder, that is, BS 110. However, in other embodiments of the present invention, the controller may determine the quantity of emergency calls based on emergency calls originating over a wider geographical area, for example, in all of communication system 100. In still other embodiments of the present invention, for two or more of the localized, regional, and global thresholds, the controller 186 may determine, for comparison to each threshold, a quantity of emergency calls based on emergency calls originating in a corresponding area, for example, in a coverage area of a single BS for the localized threshold, in a coverage area of multiple BSs, for example, all BSs served by a single MSC, for the regional threshold, and in all of communication system 100 for the global threshold. Furthermore, the determined quantity of emergency calls is a quantity of calls placed over a given time period, which time period is up to a designer of the communication system 100.

If the quantity of calls is less than the global threshold value but greater than the regional threshold value, then the controller 186 enables (520) a 'regional priority service mode' in the communication system. The term 'regional priority service mode' can be defined as a mode of operation wherein a localized priority service mode is enabled at each of multiple BSs, but not at all of the BSs, in the communication system 100. That is, the geographical range over which resources are reserved for exclusive use by emergency personnel is 'regional,' that is, wider than local but smaller than global. For example, when operating in a 'regional priority service mode,' the communication system 100 may reserve resources at a BS receiving the initial emergency call, that is, BS 110, and BSs neighboring BS 110, that is, BSs 120 and 160.

For example, in implementing a 'regional priority service mode,' the controller 186 may determine location information associated with the original emergency call, that is, the BS (BS 110) serving the first responder (MS 112) originating the emergency call, and then determine the neighboring BSs to the identified serving BS. For example, the neighboring BSs may be BSs included in a Neighbor List of the first responder's MS and/or may be BSs adjacent to the BS serving the first responder, such as BSs 120, 160. If the frequency of emergency calls initiated in the coverage area of BS 110 exceeds the regional threshold value, then the controller 186 would enable a local priority service mode at each of the neighboring BSs 120 and 160, resulting in a regional priority service mode of operation.

In various embodiments of the present invention, the location information associated with the originator of the emergency call can be any type of location information known in the art, such as an identifier of a BS serving the originator, that is, the originator's MS, or a GPS location of the originator. The first responder's MS may determine the MS's location using the location circuit 210 of the MS, and send the location to the controller 186. Based on a table of BSs maintained in the at least one memory device 404 of the controller 186, or a Neighbor List of MS 110 maintained in the at least one memory device of the controller, the controller identifies other BSs at which to enable localized priority service, thereby implementing a regional priority service mode of operation.

In another embodiment of the present invention, the controller 186 may enable the 'global priority service mode' when a quantity of BSs operating in the local priority service mode exceeds a localized mode BS threshold value maintained in the at least one memory device 404 of the controller. For example, if the localized mode BS threshold value is seven (that is, seven BSs), then when more than seven BSs are operating in the local priority service mode, the controller 186 may enable the 'global priority service mode' in communication system 100. In one such embodiment, the localized mode BS threshold value can be predetermined by a designer of communication system 100, for example, based on the requirements of the customer or an architecture of communication system 100. In other such embodiments, the localized mode BS threshold value can be dynamically determined by the controller 186, for example, based on a congestion level of the system, a frequency of emergency calls, etc.

In still other embodiments of the present invention, the controller 186 may enable the 'global priority service mode' based on an identity of the originator of the emergency call. For example, if the first responder originating an emergency call is identified as a fireman, the communication system 100 may operate in local priority service mode, that is, reserve resources for exclusive use by emergency personnel only at the originating BS, that is, the BS where the call was initiated. On the other hand, if the first responder originating an emergency call is a member of a terrorist response group, then the controller 186 may implement a regional priority service mode, such as putting all BSs operating under a same MSC in localized priority service, or may implement a global priority service mode.

Figure 6:
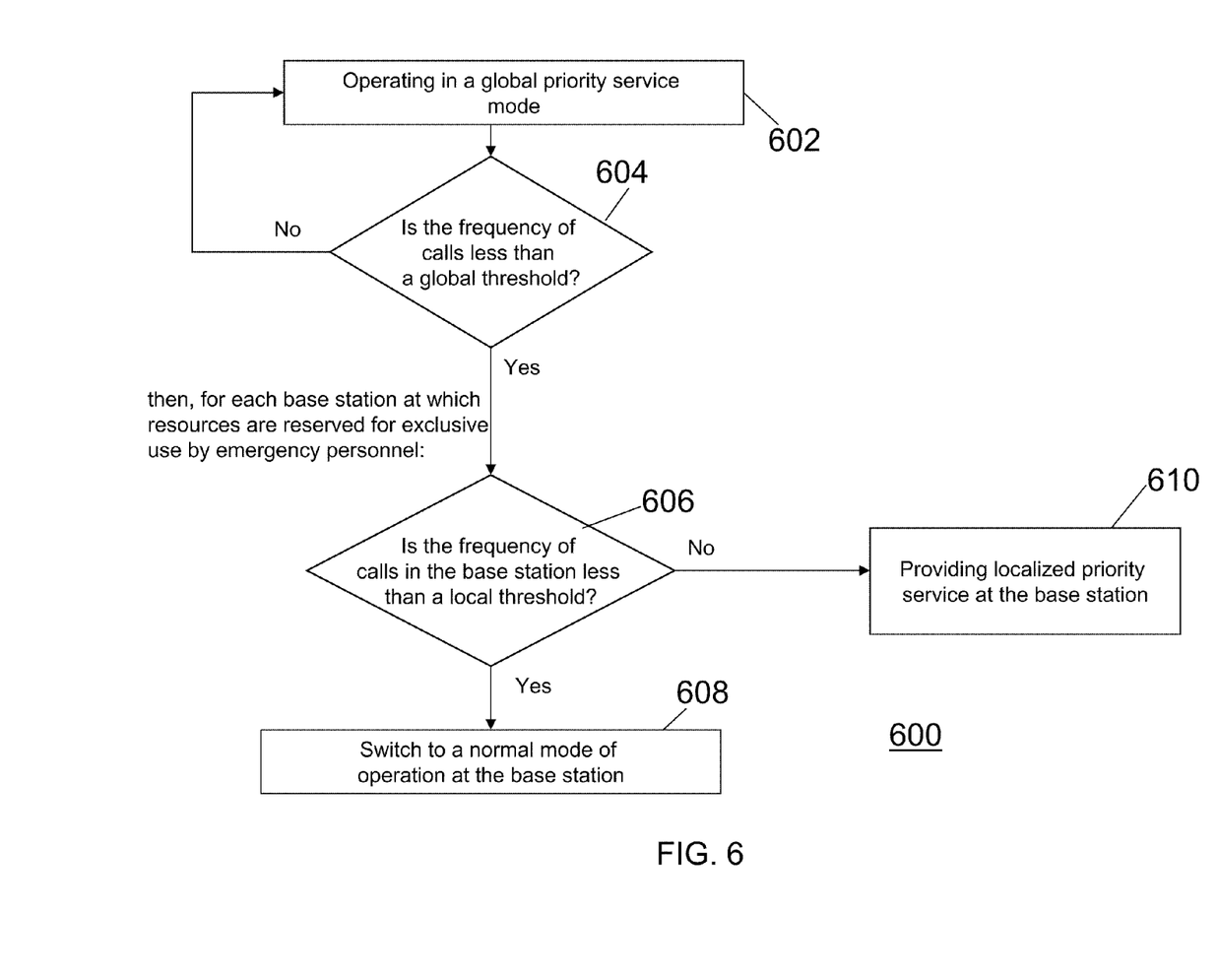
FIG. 6 is a flowchart of a method for detecting an end of the emergency event, and determining the scope of priority services of a communication system operating in a global priority service mode in accordance with some embodiment.

Turning to FIG. 6, a logic flow diagram 600 is provided that illustrates a method executed by the communication system 100, and preferably by the controller 186, for detecting an end of an emergency event, and determining an appropriate priority service mode, for a communication system operating in a global priority service mode in accordance with an embodiment of the present invention.

Logic flow diagram 600 begins when the communication system 100 is operating (602) in a global priority service mode. While operating in the global priority service mode, the controller 186 determines (604), preferably periodically, whether a quantity of emergency calls from emergency personnel, originating in a coverage area associated with the global priority service mode and over a given time period, is less than the global threshold value. If the frequency of calls is not less than the global threshold value, then the communication system 100 continues to operate (602) in the global priority service mode. If the frequency of calls is less than the global threshold value, the controller 186 determines (606), for each BS at which resources are reserved for exclusive use by emergency personnel, whether a quantity of emergency calls originating in the corresponding coverage area of the BS, over the given period of time, is less than the localized threshold value. If the quantity of emergency calls originating in the corresponding coverage area of the BS is less than the localized threshold value, then the controller 186 switches (608) the mode of operation for the BS to a normal mode of operation. Otherwise, if the quantity of emergency calls originating in the BS is not below the localized threshold value, then the controller 186 leaves the BS operating (610) a localized priority service mode.

Figure 7:
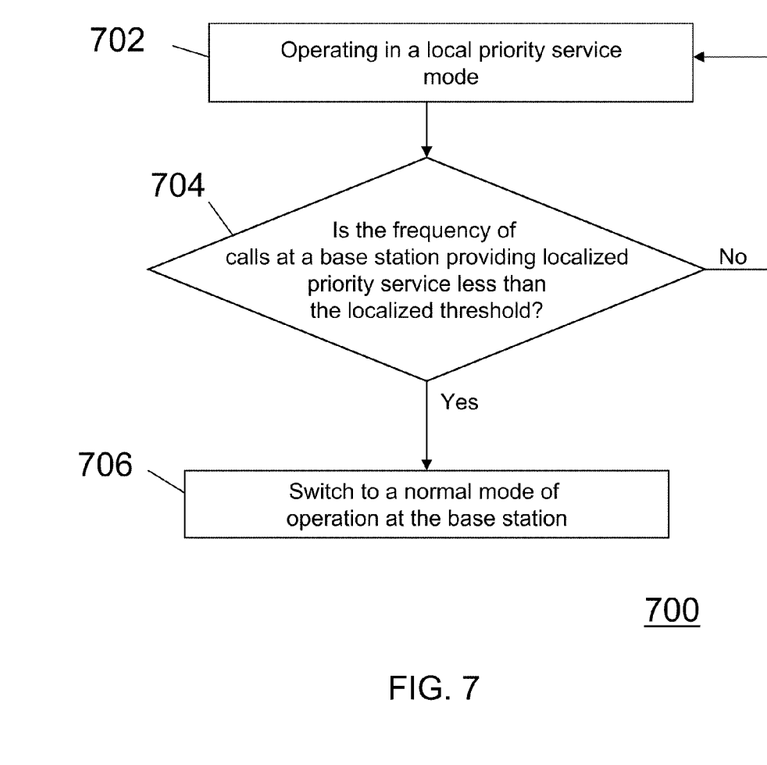
FIG. 7 is a flowchart of a method for detecting an end of the emergency event, and determining the scope of priority services of a communication system operating in a local priority service mode in accordance with some embodiment.

Referring now to FIG. 7, a logic flow diagram 700 is provided that illustrates a method executed by the communication system 100, and preferably by the controller 186, for detecting an end of the emergency event and determining the scope of priority services of BSs operating in a local priority service mode in accordance with an embodiment of the present invention.

Logic flow diagram 700 begins when the communication system 100 is operating (702) in a local priority service mode, wherein at least one BS is providing a localized priority service. While operating in the local priority service mode, the controller 186 determines (704), preferably periodically, for each BS operating in a localized priority service mode, if a quantity of calls originating in the coverage area of the BS over a given time period is less than the localized threshold value. If the frequency of calls originating in the coverage area of the BS is less than the localized threshold value, then the controller 186 switches (706) the mode of operation for the BS to a normal mode of operation. Otherwise, if the frequency of emergency calls originating in the coverage area of the BS is not below the localized threshold value, then the BS continues to operate (704) in the localized priority service mode.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for determining the scope of priority service in a communication system in an emergency event, the method comprising:

responsive to receiving information concerning an initiation of at least one emergency call from a corresponding prioritized user:
determining at least one parameter associated with the at least one emergency call, wherein the at least one parameter is one of a quantity of onging emergency calls and a priority associated with an identity of the corresponding prioritized user;
determining a particular geographical area from among a plurality of geographical areas in the communication system in which to reserve resources for use by prioritized users participating in ongoing emergency calls, as a function of the one parameter compared to a plurality of threshold values, such that if the one parameter meets a first threshold value out of the plurality of threshold values, the particular geographical area is a first subset of the plurality of geographical areas, and if the one parameter meets a second threshold value out of the plurality of threshold values, different from the first threshold value, the particular geographical area is a second subset of the plurality of geographical areas that includes the first subset of geographical areas and at least one additional geographical area not included in the first subset; and
reserving resources in the communication system for use by prioritized users participating in ongoing emergency calls based on the determined particular geographical area.

2. The method of claim 1, wherein determining the particular geographical area further comprises comparing the one parameter to a third one of the plucality of threshold values, different than the first and second threshold values, such that if the one parameter meets thethird threshold value, the particular geographical area is every geographical area in the communication system, including both the first subset and second subset and at least a further additional geographical area not included in the first and second subsets.

3. The method of claim 2, further comprising reserving resources in a first base station and in a second base station in the communication system, to allow at least a ninety percent probability of successful emergency call completion in the communication system by the prioritized users participating in ongoing emergency calls.

4. The method of claim 1, further comprising:
determining location information associated with the at least one emergency call;
identifying a first base station in the communication system based on the determined location information; and
wherein the determined geographical area comprises at least the first base station.

5. The method of claim 4, further comprising reserving resources at the first base station for implementing a priority service in the first base station.

6. The method of claim 1, wherein the one parameter is the quantity of ongoing emergency calls; and
wherein reserving resources comprises limiting the reservation of resources for use by prioritized users to a first base station in the determined particular geographical area of the communication system and fewer than all base stations in the commucication system when a quantity of ongoing emergency calls is greater than the first threshold value and less than the second threshold value.

7. The method of claim 6, further comprising identifying a second base station in the communication system based on the location information of each emergency call of a plurality of emergency calls and, when the quantity of ongoing emergency calls is greater than the second threshold value but less than a third threshold value, reserving resources comprises reserving resources for use by prioritized users participating in ongoing emergency calls at both the first base station and the second base station but fewer than all base stations in the communication system.

8. The method of claim 7, wherein the second base station is a neighboring base station to the first base station.

9. The method of claim 7, further comprising reserving resources in the first base station and the second base station in order to allow a ninety percent success rate of emergency call completion in the communication system.

10. The method of claim 1, further comprising releasing resources reserved for use by prioritized users participating in ongoing emergency calls when the first parameter falls below the first threshold value.

11. The method of claim 1, wherein the at least one parameter is the priority associated with the identity of the corresponding prioritized user.

12. The method of claim 1, wherein reserving resources in the communication system for use by prioritized users participating in ongoing emergency call comprises:
   determining a quantity of resources such that a noise rise on an uplink is limited to a predetermined level that will assure that a mobile station of the corresponding prioritized user has sufficient power to transmit at an acceptable signal quality level; and
   reserving at least the determined quantity of resources.

13. A network element for determining the scope of priority service in a communication system in an emergency event, the network element comprising:
   a wireless interface for receiving information concerning at least one emergency call;
   a processor coupled to the interface that is configured to, responsive to receiving the information concerning at least one emergency call:
      determine at least one parameter associated with the at least one emergency call from a corresponding prioritized user, wherein the at least one parameter is one of a quantity of ongoing emergency calls and a priority associated with an identity of the corresponding prioritized user;
      determine a particular geographical area from among a plurality of geographical areas in the communication system in which to reserve resources for use by prioritized users participating in ongoing emergency calls, as a function of the one parameter compared to a plurality of threshold values, such that if the one parameter meets a first threshold value out of the plurality of threshold values, the particular geographical area is a first subset of the plurality of geographical areas, and if the one parameter meets a second threshold value out of the plurality of threshold values, different from the first threshold value, the particular geographical area is a second subset of the plurality of geographical areas that includes the first subset of geographical areas and at least one additional geographical area not included in the first subset; and
      reserve resources in the communication system for use by prioritized users participating in ongoing emergency calls based on the determined particular geographical area.

14. The network element of claim 13, wherein the processor is further configured to determine the particular geographical area further by comparing the one parameter to third one of the plurality of threshold values, different than the first and second threshold values, such that if the one parameter meets the third threshold value, the particular geographical ares is every geographical area in the communication system, including both the first subset and second subset and at least a further additional geographical area not included in the first and second subsets.

15. The network element of claim 13, wherein the processor is further configured to determine location information associated with the at least one emergency call, identify a first base station in the communication system based on the determined location information, and wherein the determined geographical area comprises at least the first base station.

16. The network element of claim 13, wherein the one parameter is the quantity of ongoing emergency calls; and
   wherein the processor is further configured to identify at least one first base station in the determined particular geographical ares of the communication system based on the location information of each emergency call of a plurality of emergency calls and, when a quantity of ongoing emergency calls in the communication system is greater than both the first and a second threshold values of the plurality of threshold values but less than a third threshold value, reserve resources for use by prioritized users participating in ongoing emergency calls at both the at least one first base station and a second base station but fewer than all base stations in the communication system.

17. The network element of claim 13, wherein the one parameter is the quantity of ongoing emergency calls; and
   wherein the processor is further configured to reserve resources by limiting the reservation of resources for use by prioritized users participating in ongoing emergency calls at only a first base station in the communication system when the quantity of calls is greater than the first threshold value of the plurality of threshold values and less than the second threshold value of the plurality of threshold values.

18. The network element of claim 13, wherein the processor is further configured to release resources reserved for use by prioritized users participating in ongoing emergency calls when the first prameter falls below the first threshold value.

19. The network element of claim 13, wherein the processor is futher configured to reserve resources in the communication system for use by prioritized users by determining a quantity of resources such that a noise rise on an uplink is limited to a predetermined level that will assure that a mobile station of the corresponding prioritized user has sufficient power to transmit at an acceptable signal quality level and reserving at least the determined quantity of resources.

20. The method of claim 1, wherein the at least one parameter is a priority associated with an identity of the corresponding prioritized user, wherein the first threshold is a lower priority associated with a first type of emergency responder, and wherein the second threshold is a higher priority associated with a second type of emergency responder.

21. The method of claim 20, wherein the first type of emergency responder is a fire fighter, and the second type of emergency responder is a terrorist response group.

* * * * *